United States Patent [19]

Vanneste et al.

[11] Patent Number: 4,788,394

[45] Date of Patent: Nov. 29, 1988

[54] MULTI-WIRE INDUCTION HEATING

[75] Inventors: Godfried Vanneste, Ingelmunster; Michel Neirynck, Kortrijk, both of Belgium

[73] Assignee: N.V. Bekaert S.A., Zwevegem, Belgium

[21] Appl. No.: 142,352

[22] Filed: Dec. 29, 1987

Related U.S. Application Data

[63] Continuation of Ser. No. 834,790, Feb. 28, 1986.

[30] Foreign Application Priority Data

Mar. 6, 1985 [GB] United Kingdom ............... 8505811

[51] Int. Cl.[4] .............................................. H05B 5/00
[52] U.S. Cl. ........................... 219/10.61 R; 219/10.79
[58] Field of Search ........................... 219/10.61, 10.79

[56] References Cited

U.S. PATENT DOCUMENTS

| | | |
|---|---|---|
| 1,980,875 | 11/1934 | Northrup . |
| 2,385,031 | 9/1945 | Schneider et al. ............... 219/10.61 |
| 2,675,461 | 3/1954 | Leonard ........................... 219/10.61 |
| 3,041,434 | 6/1962 | Alf . |
| 3,574,005 | 4/1971 | Rudd . |
| 4,086,462 | 4/1978 | Scheffler et al. ............ 219/10.79 X |
| 4,118,617 | 10/1978 | Moreau . |

FOREIGN PATENT DOCUMENTS 0090488 10/1983 European Pat. Off. .

OTHER PUBLICATIONS

"Induction Heating Handbook"—J. Davies, P. Simpson, McGraw-Hill, U.K. 1979.

*Primary Examiner*—Roy N. Envall, Jr.
*Attorney, Agent, or Firm*—Foley & Lardner, Schwartz, Jeffery, Schwaab, Mack, Blumenthal & Evans

[57] ABSTRACT

In the induction heating of thin (e.g. 0.5 to 3 mm diameter) steel wires (W) in continuous heating processes, relatively low field strengths of e.g. up to 20,000 $Am^{-1}$ are employed but are chosen so as to set the relative magnetic permeability $\mu r$ at 40 or more. The wire are passed through coil blocks (1), which are wound flat around a row of ceramic tubes (3) to guide and insulate the wires. The coil blocks are energized at frequencies typically up to 30 kHz. The direction of winding and/or the phase of the current is changed between adjacent coil blocks (1), or groups of blocks, to reduce voltage build-up along the wires.

57 Claims, 5 Drawing Sheets

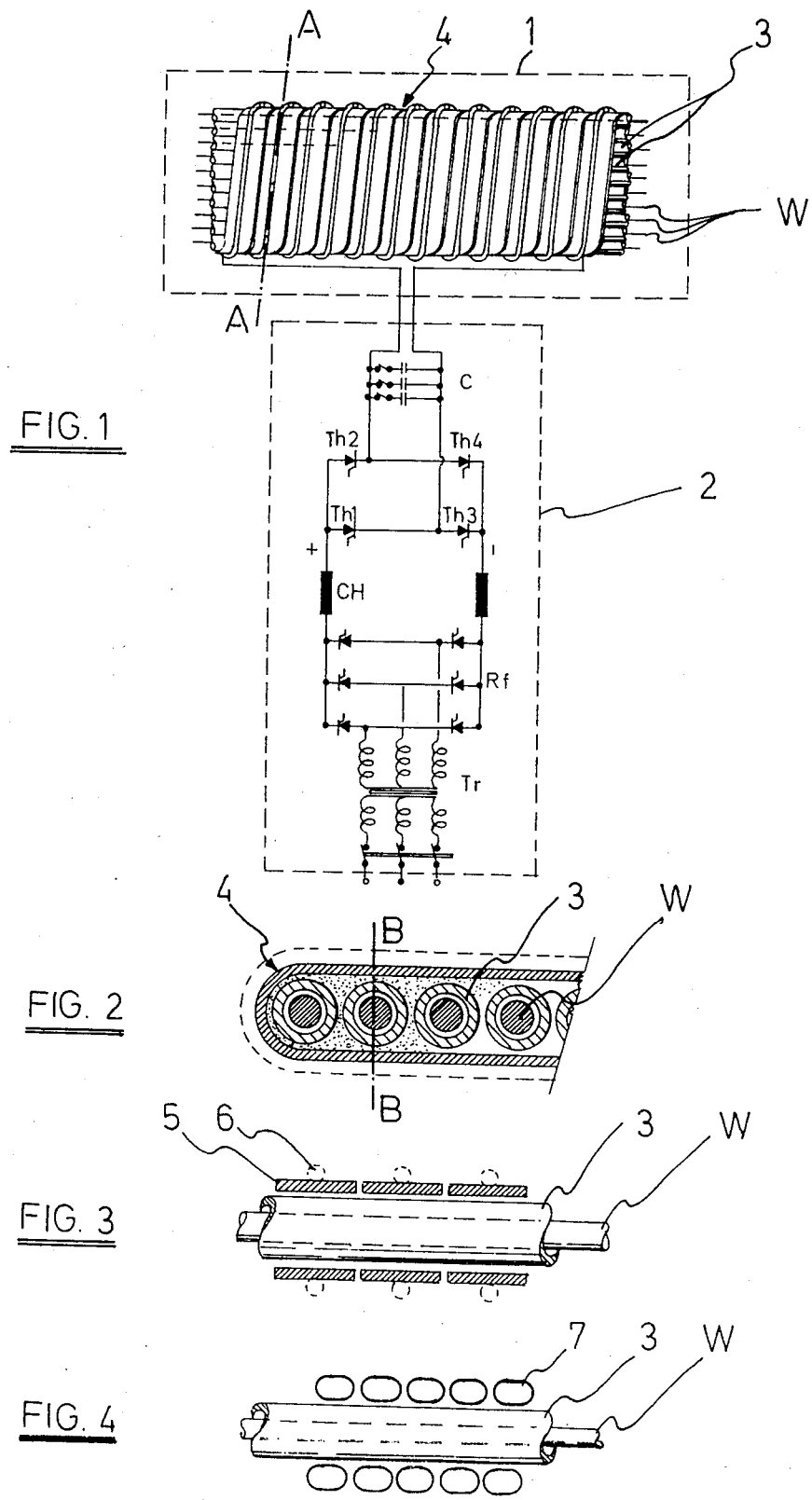

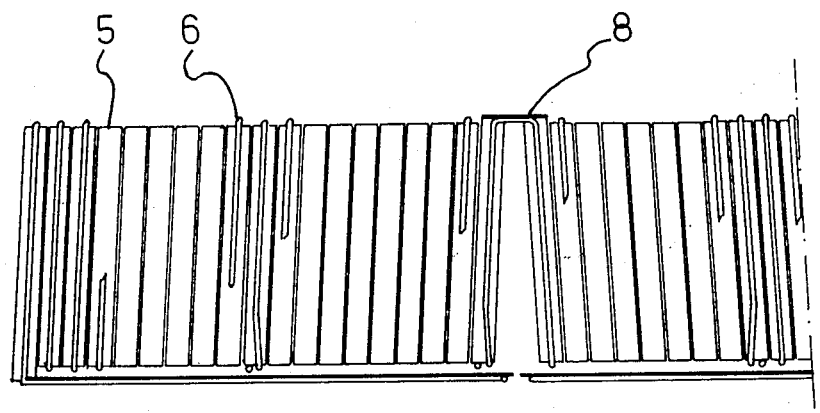
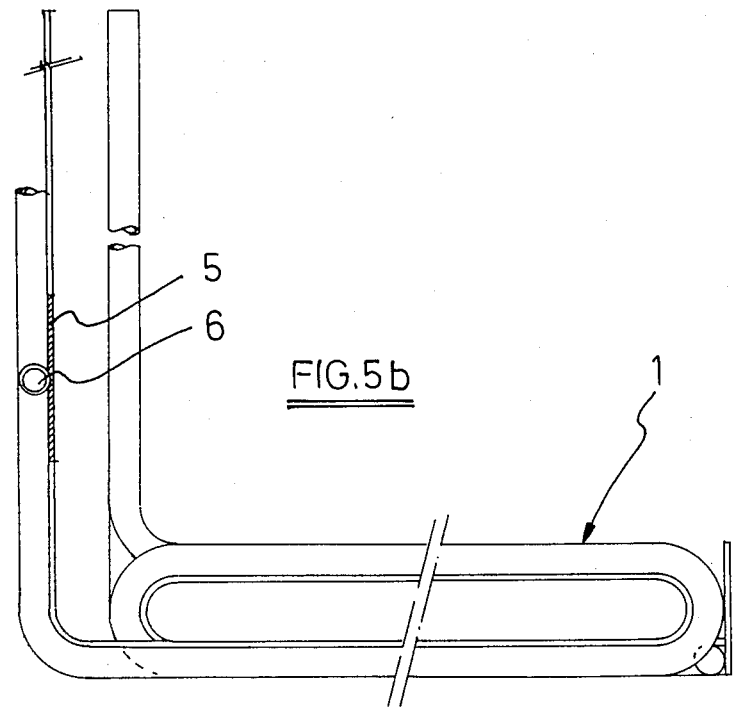

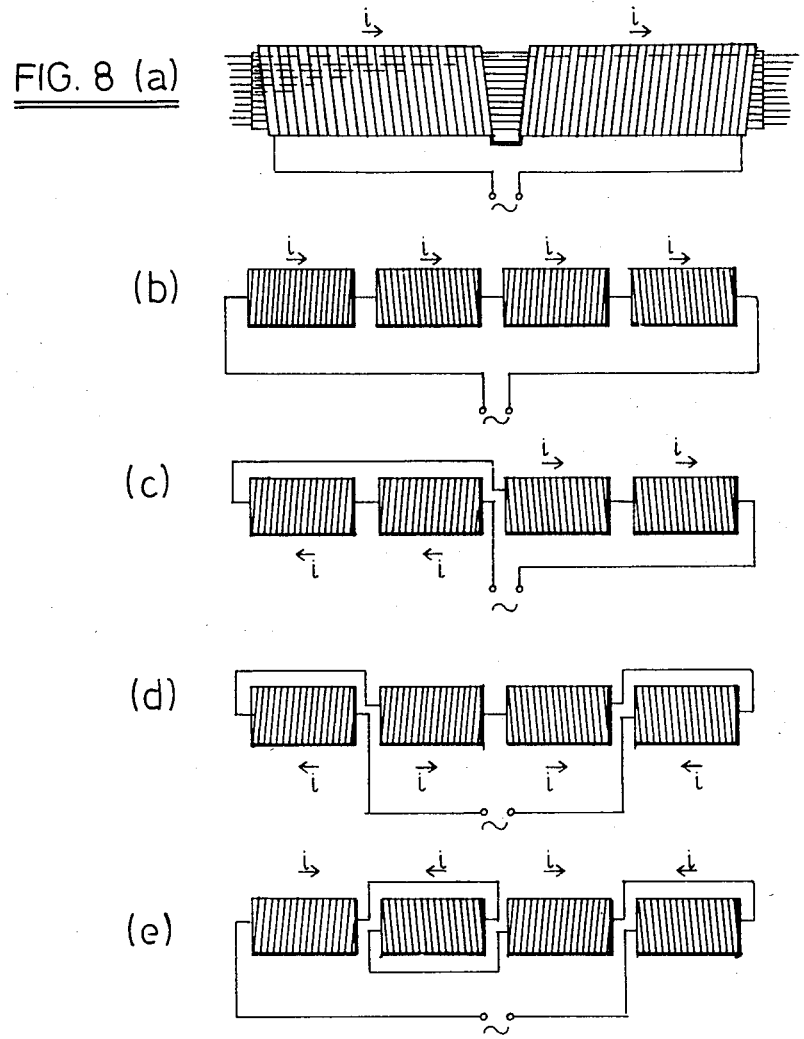
FIG. 8 (a), (b), (c), (d), (e)
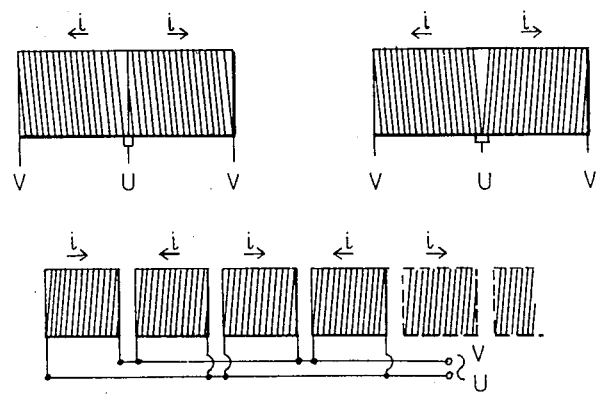
FIG. 9 (a), (b), (c)

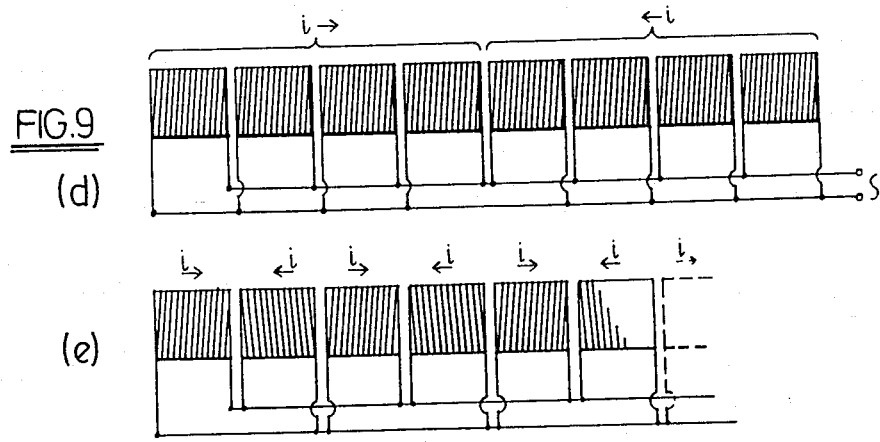
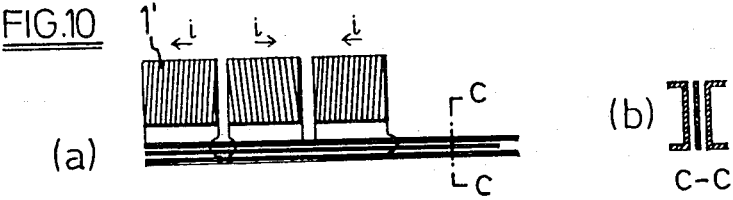

MULTI-WIRE INDUCTION HEATING

This application is a continuation of application Ser. No. 834,790, filed Feb. 28, 1986.

This invention relates to induction heating and particularly to the induction heating of elongate metal articles such as steel wires by passing them through induction coils.

There is frequently a need to heat steel wires to low or intermediate temperatures. Examples of thermal treatments are thermal diffusion, stress relieving, tempering, partial or full annealing, and so forth. The heating step may be carried out separately or in line with other stages such as surface treatments, coating processes, deformation processes etc. The present invention is especially concerned with the heating of steel wires of a diameter less than 5 mm, and preferably in the range 0.5 to 3 mm, to temperatures not exceeding the Curie temperature (750°–760° C.). The invention may be applied to other processes, however. For production purposes, it is generally desirable to heat a plurality of wires simultaneously while they move continuously in parallel paths and the invention is particularly applicable to such a context.

Conventional devices in use for simultaneously heating a plurality of steel wires include for example fuel-fired or electrical furnaces, molten lead or salt baths and resistive heating lines making use of direct electrocontact wire heating and the like.

The performance of conventional furnaces is limited with regard to high speed precise heating of wires up to 750° C., because of rather slow heat transfer rates in this low to intermediate temperature range. As a consequence, furnaces of considerably increased length are necessary for achieving high wire throughput speeds, which is both technically and economically an unattractive solution. Direct immersion heating in molten salt and lead, to the contrary, is rapid and more effective, but the major drawbacks here are wire surface contamination, demanding extra cleaning, and inferior working conditions.

Direct electroresistive devices, feeding the heating current to the wires by means of electro-contact rollers, have been adopted by the industry for several wire heating applications. With increasing speed and power density, however, it has been found that the risks of sparking and surface defects may become very critical. In the production of high quality and fine wires, this is highly undesirably.

A promising solution is afforded by induction heating methods which produce rapid non-contact heating. Induction heating is nowadays a widely spread technology for heating large-sized workpieces such as billets, bars and rods prior to forging or working etc. and for surface hardening articles such as axles, sucker rods, etc. The technique is already applied in some specific areas of the wire industry, for example for stress relieving of prestressed concrete wire and strands. It has also been employed to a given extent for the annealing of drawn copper wire in line with the wire drawing machine.

Induction heating is not, however, widely used in multiwire installations, which at present can treat a large number of wires (5, 10, 20, 30 and even 40 or more) simultaneously. The concept of non-contact inductive heating of a plurality of wires has long been regarded as being technically impractical and/or too wasteful in energy and capital, in particular for smaller wire sizes. It has been stated that induction heating is too expensive because of the reputed need for distinct induction heating coils for each wire track, and the complexity of branching all the inductors to current supplies of suitable frequency. Similarly, it is a common belief and experience that electrical and/or thermal efficiency remain inadequate when comparing induction heating of wires to other heating methods. In this respect it has been believed that inductively heating small diameter wires is not only highly unsatisfactory but may become even impossible below a certain diameter limit of, say, 1 to 1.5 mm.

The particular problem of effective inductively heating thin to medium-sized steel wires, roughly below 2-3 mm in diameter, has several aspects the ratio of penetration depth of the induced current to wire diameter becomes critical, the magnetic coupling losses are large due to the poorer coil filling degree, i.e. the poor ratio of wire to coil diameter, and so on. To remedy these factors it has been tried to pass a plurality of wires through a single cylindrical induction coil to increase the effective filling degree. Other trials have been made, but none was really successful or capable of satisfyihg the requirements of practicality and economics demanded in modern multiple wire processing lines.

With regard to certain known principles and theory of induction heating, examples of references are the following:

"Induction heating"—Simpson P. G., Mc Graw-Hill, N.Y. 1960

"Induction heating handbook"—J. Davies, P. Simpson, Mc Graw-Hill, U.K. 1979

U.S. Pat. No. 4.118.617: Process and apparatus for continuous heat treatment of metallic wires and bands.

European Patent Application No. 90.488: Apparatus for simultaneously heating a plurality of elongated workpieces.

When considering a cylindrical workpiece in a solenoid, the basic factors determining effective induction heating are the frequency and density of the energizing current, the air gap between the workpiece and coil i.e. the ratio of workpiece to coil internal diameter, and the geometric disposition of the coil windings.

For assessing the heating power which is active in the workpiece itself, one has to consider primarily the effective penetration depth (p) of the induced current which is given by the formula [1]:

$$p = \sqrt{\frac{\rho}{\pi \cdot \mu_o \cdot \mu_r \cdot f}} = 5033 \sqrt{\frac{\rho}{\mu_r \cdot f}}$$

with
p: in centimeters
$\rho$: electrical resistivity of workpiece (in ohm-cm)
$\mu_r$: relative effective magnetic permeability
f: frequency in cycles/sec.

Because, e.g., 87% of the total heat is produced by the induced current in the effective penetration depth p, it is clear that the penetration depth should be kept sufficiently below half of the workpiece diameter ($p = \frac{1}{2}d$) to prevent redundancy of the induced current. The penetration depth is frequency dependent and for ferromagnetic steel rods for example, can vary from 1 mm to 10 mm at commonly used mains frequencies, i.e. f=50 Hz. The problem of current losses in the workpiece center becomes particularly acute in the induction heating of small diameter wires. For effectively induction heating medium to small wires, say from below 3 mm, it will be necessary to use current frequencies of at least a few thousand Hertz.

The electrical efficiency of an induction heating coil is expressed by formula [2]

$$\eta_E = \cfrac{1}{1 + \sqrt{\cfrac{\rho_{cu}}{\rho_w \cdot \mu_r} \cdot \cfrac{D}{d} \cdot \cfrac{1}{k} \cdot \cfrac{L}{l}}}$$

with $\rho_{cu}$: resistivity of coil windings (copper material)
$\rho_w$: resistivity of workpiece (e.g. steel wire)
$\mu_r$: relative permeability of workpiece (e.g. steel wire)
D : diameter of coil windings
d : wire diameter
L : length of induction col
l: effective length of wire enclosed by induction coil
k: current efficiency coefficient (k<1) dependent on ratio d/p, i.e. wire diameter to penetration depth. k~1 for d>p.

The heating power Pw dissipated in the workpiece is given by [3]

$$P_w = H^2 \cdot \cfrac{\rho_w}{p} \cdot \pi \cdot d \cdot l \cdot k$$

with:

H (=NI/L): inductive magnetic field
I: energizing current
p: penetration depth
N: number of windings From [3] it follows that the amount of heat generated increases in proportion to $H^2$ or $I^2$, A decreasing penetration depth p also raises heat input. In induction heating of bars and billets, it is common practice to apply high current densities (still supportable by the coil windings) up to saturation level of the magnetic field, Hs. In case of small wire diameters, it seems reasonable to seek the lowest feasible penetration depths (p), by using high frequencies, and to use high current densities.

We have found, however, that this frequently gives erratic results and very poor heating efficiencies, especially when heating wires of the diameter range 0.5-2 mm. We have found that the heating difficulties stem to a large extent from the delicate balance between the electrical and thermal energies when inductively heating small wires. Too high frequencies and/or current densities may either result in overheated, or even burnt, surfaces, or in widely fluctuating actual thermal efficiencies. As a consequence a large scatter in the required wire temperatures is obtained and total energy efficiency remains at levels incompatible with effective and economic heating. The problem can become very acute in the lower wire range of 0.5 to 1.5 mm diameter, where magnetic coupling, pronounced skin effect and heat losses from the wire surface to e.g. water cooled coil windings can adversely affect either heating capacities or efficiency.

The object of one aspect of the present invention is to overcome or alleviate these problems. Thus it is proposed to use relatively low energy densities (to avoid surface overheating and to reduce the amount of less controllable heat losses of the wire rim to the surroundings), and a shift towards high values of magnetic permeability for the wires.

Such an arrangement will improve electrical efficiency (see formula [2]) and it should further be noted that the relative magnetic permeability for steel wires increases with decreasing field strengths. Rewriting formula [3] as the heating power dissipated per unit volume of wire, gives:

$$P_w = 4\pi H^2 \mu_o \mu_r \cdot f \cdot k \cdot p / d \qquad [4]$$

Thus, considering the factor $H^2 \mu_r$ it will be seen that a decrease in field strength does not produce an equivalent decrease in heating power, since there will be an increase in $\mu_r$. We have found that it is possible to adjust the parameters, so as to permit a departure from the conventional use of high field strengths whilst still obtaining sufficient heating powers.

Thus viewed from this aspect the invention provides a method of induction heating an elongate steel element in an induction coil, characterised in that the magnetic field strength is so adjusted that the relative magnetic permeability of the element is at least 40.

This is well above the level normally used, with typical values being in the range 10–20 for fields approaching saturation. Preferably, in carrying out the present invention, the realtive magnetic permeability is at least 80, and a typically useable range is 100 to 200.

This aspect of the invention is particularly applicable to thin steel wires having a diameter of less than 5 mm, and a particularly useful range is up to 2 or 3 mm. The lower limits may be about 0.5 mm.

The magnetic field will generally be in the range of 3,000 to 35,000 amperes turns per meter, and preferably 5,000 to 20,000 Am$^{-1}$. Typical frequencies which will be used, may be up to 50,000 Hz, and a preferred range is 5,000 to 30,000 Hz.

It will be appreciated that the heat input may be less than for conventional arrangements, although by virtue of the invention it will be at practical levels. This means that the length of time required for heating will be increased. The invention is particularly concerned with the heating of continuously moving wires and thus, in comparison with what would be the case in a conventional heating arrangement, greater coil lengths will be required. This results in another potential problem to be solved.

The heating requirements will vary according to wire type and diameter, and the coil length will also depend on the wire speed which may, for example, be in the range of 10 to 100 m. per minute or more. A typical coil length may, for example, be about 2 or 3 m to 5 m. We have found that this can result in unacceptably high induced potential differences over the wire length. This is normally not a problem in induction heating, but in this particular case—when using long coils and continuous wire lines—the accumulated voltage in the longitudinal wire direction may attain a critical value (up to more than 50 V) and thereby cause sparking between the wire and the grounded components of the installation such as guiding members, take-up reels and the like, which may result in intolerable wire surface marks or defects.

It is believed that a main cause of excessive voltage accumulation in the longitudinal wire direction is the fact that, due to the pitch of the coil windings relative to the wire axis, a spatial electric field is induced in the wire, which is slightly inclined to the wire direction.

The spatial electric field can be resolved into a large radial component and a small axial component the vector sum of which creates a gradual potential increase along the wire length.

We have found that the problem can be resolved by dividing the length of the induction coil into at least two parts and by reversing the winding direction and/or the phase of the current in the two parts.

This may be of use in other circumstances where relatively long induction coils are required and thus viewed from another aspect the invention provides induction heating apparatus with a coil in which an element is to be placed, characterised in that at least two adjacent lengths of coil are provided, with the direction of coil winding and/or the phase of the energising current being reversed between adjacent lengths.

It has been found that phase reversal has a greater effect than the direction of winding. However, the best results are achieved by effecting both and this also reduces dead spots in the magnetic field due to the interaction of the ends of adjacent coils.

These arrangements may be obtained readily by having a plurality of coil modules which can be arranged with respect to each other, and connected to an energising supply, in such numbers and combinations as may be required for any particular application.

It will be appreciated that, in general, the reversal of coil winding results in a reversal of the angle of inclination of the windings to the axis of the coil.

Another aspect of the invention is concerned with the construction of the induction coil itself. As noted already the air gap between the workpiece and the coil should be kept to a minimum, i.e. from formula [2], D/d should be low for best efficiency. This presents problems when large numbers of wires are to be treated. Proposals to use individual coils for each wire, are not economical. On the other hand, placing a number of wires in a simple coil results in large values of D/d inconsistencies in the treatment of wires, dependent on their position.

Thus, viewed from another aspect, the present invention provides induction heating apparatus including a coil in which a plurality of elongate elements are to be placed, characterised in that the coil has a generally flat cross section in which the elements are to be arranged in a row. The cross section may thus be in the form of an elongate rectangle, with the ends preferably rounded.

It is conceivable that two or even three rows could give reasonable results, but most preferably the arrangement is such that a single row only is accommodated. There will be a planar array of parallel wires or other elements with the turns of the essentially flat coil closely enveloping the array. Preferably, the coil windings themselves are flat and are made of copper strip.

Whilst the theoretical formulae given earlier are for the case of a single thick section enclosed by a cylindrical coil, the advantages of the various other aspects of the invention are retained with the use of the flat coil and an array of discrete, largely identical small sections, i.e. wires.

A particularly preferred and advantageous arrangement involves the use of guides to space the individual wires (or the like) apart and guide them through the coil. Such guides could be in the form of open channels or the like, and continuous or intermittent. Preferably, however, the guides are in the form of parallel, continuous tubes.

The guides themselves are preferably electrically insulating and could be made from ceramic or other refractory material.

Some embodiments of various aspects of the invention will now be described by way of example and with reference to the accompanying drawings, in which:

FIG. 1 is a plan view of a general embodiment of a heating apparatus comprising a multiwire induction coil connected to a medium-frequency generator;

FIG. 2 is an enlarged cross-sectional view of the inductor taken along the line A—A of FIG. 1;

FIG. 3 is an enlarged cross-sectional view taken along line B—B of FIG. 2 and showing one preferred embodiment of the coil winding configuration in the longitudinal wire direction;

FIG. 4 shows another preferred embodiment of the coil winding construction;

FIG. 5a and 5b show a more detailed view of a specific embodiment of a multiwire induction heating coil construction comprising copper strip windings with brazed-on copper cooling tubes;

Figure 7A:
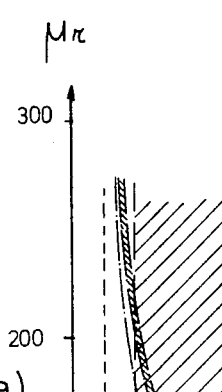
Figure 7B:
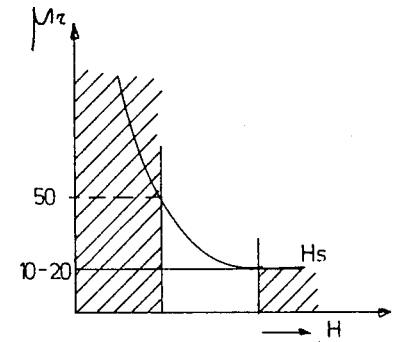

FIG. 7a gives a graphical representation of the working range (magnetic field strength and permeability) in the method according to the invention in comparison with conventional practice;

FIG. 7b shows in particular the measured $\mu$r-values of common ferrous wires versus ampere turns per meter;

FIG. 8 (a–e) are schematic representations of serially connected heating coil arrangements to accommodate longitudinal voltage build-up in the wire direction;

FIG. 9 (a–e) are schematic representations of parallel connected heating coil arrangements for minimizing the voltage build-up in the axial direction of inductively heated wires;

FIG. 10a shows an embodiment of a multi-wire induction heating block concept containing also an improved current supply connection and 10b is an enlarged cross-sectional view taken along line CC of FIG. 10a showing the current supply connection; and FIG. 11a and 11b show some specific heating line set-ups permitting heating and soaking (11a), and heating above the Curie-temperature (11b) and 11c and 11d are schematic representations of the heating line setup of 11a and 11b , respectively.

Referring now to FIG. 1, giving a general view of an inductive heting system, there is shown a multiwire induction heating coil 1 energized by a medium (or high) frequency current supplied by a suitable generator 2. The electrical circuitry of generator 2 normally comprises a power supply transformer (Tr) and a 3-phase Thyristor rectifier bridge (Rf), choke coils (CH), a thyristor (Th1 to Th4) controlled frequency current generating section and a capacitor array (C) of appropriate capacitance (to compensate the impedance of the load circuit in relation to the electrical characteristics of the generator).

A plurality of wires W travel continuously through a flat inductor 1 and specifically, each wire passes through a distinct heat and electrically insulating tubular guide 3. The guides are preferably ceramic tubes of suitable cross-section and are arranged here as a one-layer planar row, enveloped by the windings 4 of the heating coil. For round wires one normally uses cylindrical tubes, whereas for shaped wires such as e.g. flat wires, a tube with rectangular cross-section can be envisaged. The coil windings may be made of solid high-conductivity copper wire, cable or strip, orovided suitable cooling means are incorporated in the coil outer construction (e.g. a water mantle separated from the coil interior and directly contacting the windings) or of tubular copper windings with inner water cooling.

FIG. 2 gives a cross-sectional view, perpendicular to the wire direction, of a flat multiwire heating coil clearly showing the location of coil windings (4), ceramic tubes (3) and wires W.

FIGS. 3 and 4 give further details by showing a longitudinal cross-section of the heating coil through the wire axis (along line B—B of FIG. 2). In FIG. 3 an embodiment is shown wherein the coil windings consist of solid copper strip (5) which is water-cooled by means of a continuous copper tube (6) brazed on the exterior surface of the strip windings. This type of copper windings makes it possible to fabricate very flat heating coils with an interior inductor tunnel height of even below 20 mm.

FIG. 4 shows a heating coil type formed of water cooled copper tubes (7), which preferably have an oval shaped, flat-rounded or flattened cross-section for the purpose of being coilable to low inductor heights (closely matching the outer periphery of the tubular wire guide array on the inside). In constructing and using the heating coils, it is important to bring inductor height as close as possible to the interior conveying tubes and to hold this height constant in the lateral and longitudinal coil direction during service.

Among the several possibilities for fabricating a multiwire coil one may choose the following method. First the copper conductor is wound on a mandrel of suitable dimension to form a heating coil of desired geometry (height, width, length and number of turns per meter). The coil is stress relieved for form stability, and coated with a polymeric or other material to insulate the individual inductor turns (e.g. stretching the coil helix as a spring and dipping it in a suitable varnish, curing /drying, releasing the helix). Thereafter the bare coil is provided with appropriate mechanical fixing means and with the necessary electrical connections and cooling accessories. Alternatively the coil windings can also be permanently stabilized by means of a rigid mass, e.g. by mouldforming in a suitable plastic material (epoxy and the like) or in a fibrous cementitious material such as fibre cement or fibre concrete.

The interior tunnel space of the finished inductor is provided with the prescribed plurality of suitable guiding channels, which could be provided by a multigroove refractory plate or a multi-hole muffle but in this case comprises the plurality of ceramic tubes 3 to convey the wires individually through the inductor.

Between the ceramic tubes and the copper windings, one can also dispose an extra heat-insulating barrier layer, e.g. a mica sheet, a refractory fibre felt or the like, for the purpose of further reducing heat loss of the wires to the windings. This layer also increases system security in case of an accidental break of a tubular guide, and elminates risk of direct contact between wire and coil.

The ceramic tubes inserted in the flat rectangular inductor channel (having a height of a few millimeters larger than the tube diameter) are fixed at a coil entry and exit by appropriate clamping means. When the total heating length is composed of a plurality of separate adjacent coil modules, the ceramic tubes may either be continuous over the entire heating paths or they can extend over the length of one coil block only and then be connected in line with the subsequent modules by suitable flanges. The advantage of the latter arrangement relies upon the fact that a broken tube and/or a faulty coil module is quickly removed and replaced by a new component.

FIG. 5 gives a more detailed view of an inductor comprising a continuous coil length subdivided in two serially connected coil sections, having opposite winding pitch directions (change of winding direction in the coil middle 8). In this embodiment the coil windings are made of copper strip 5 bearing a brazed-on cooling pipe 6, which is shown in more detail in the deployed cross-section of FIG. 5b. This coil has a length of about 2.4 meters and comprises 37 turns of copper strip 2 mm × 55 mm. The interior coil height is 20–22 mm and in the inductor channel, having a width of less than 60 cm, 36 ceramic tubes of 15 mm outer diameter and 2 mm thickness can be fitted. This means that in this case wire spacing is nearly 15 mm. When using smaller tubes, wire spacing can still be lowered to increase the inductor filling factor. In a production line, however, the minimum attainable spacing will also depend on practical considerations such as the difficulty of pulling the wires through very small holes, which can lead to wire breakages, availability of small-diameter ceramic tubes, possibility of wire entanglement, etc. When the induction heating step is integrated in a wire processing line, the actual wire interdistance can also be imposed by the minimum spacing attainable in the process step prior or subsequent to the heating step.

Figure 6A:
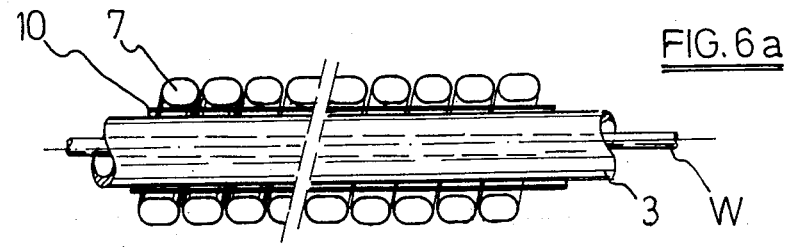
FIG. 6a is another preferred embodiment of an induction heating line having a sequence of identical multiwire inductors.
Figure 6B:
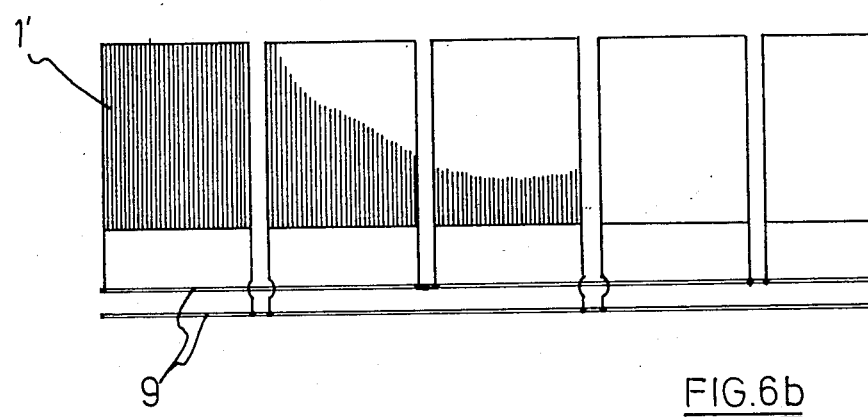
FIG. 6b is a schematic representation of a preferred embodiment of an induction heating line featuring a modular building block concept with a sequence of identical multiwire inductors, connected in parallel to the supply.

In FIG. 6 a multiwire induction heating line is schematized, comprising a sequence of separate coil blocks (1'), each featuring a multiwire coil construction. The coil is made of oval shaped tubular copper windings 7 (36 turns of roughly 10 mm width) as depicted in FIG. 6a. Here the conductor windings are separated from the ceramic tubes by means of a heat-resistant insulating layer 10 of a few mm thickness. In FIG. 6b the coil blocks (1') are connected in parallel to the current supply by means of 2 parallel bus bars 9. This arrangement is very favourable for maintaining the useful capacity of the generator at a high level (versus installed power capacity) because ohmic and inductive voltage losses over bus bars and heating coils can be kept low as compared to serially connected coil blocks featuring considerably longer current supply lines.

FIG. 7a illustrates the dependence of relative magnetic permeability $\mu r$ on applied field strength H based on the magnetic measurements carried out on several ferrous wire types (band A relates to unalloyed low and high carbon steel wires, curve B relates to ferritic high-Cr steel wire). The selected working range corresponds to $\mu r$ values above 40–50, preferably above 80 and most preferably from 100 to 200. To achieve these conditions, coil design (turns per m) and energizing current are adapted to cover a broad working range from 3,000 to 35,000 A/m, preferably from 5,000 to 20,000 Am.

It will be noted that for $\mu r$ values above about 200, the rapid change in $\mu r$ for a change in H can lead to undesirable fluctuations in working conditions.

This approach considerably departs from the working range close to or beyond the saturation magnetization Hs μr far below 40 and usually around 10–20), which is the normal prior art procedure of induction heating, as indicated in FIG. 7b.

In using the multiwire flat coils and in applying the energizing conditions prescribed, coil efficiencies from 60 to 90% (according to wire diameter) are obtainable, typically from 70 to 85% for the wire diameter range 0.75-2 mm at generator frequencies from 8,000 to 25,000 herz. Total actual energy efficiencies (which also depends on actual generator efficiency and its efficiency versus load curve) in all cases tried exceeded 50%, and in a majority of practical processing situations the system total energy efficiency ranged from 60 to 75%, which are surprisingly high levels for the wire diameters concerned.

FIG. 8 shows various heating coil arrangements for reducing voltage build up, whereby either a continuous long coil is subdivided into at least two coil sections which are wound in opposite senses (FIG. 8a), or whereby the total heating length is composed of a varying number of serially connected distinct coil blocks (FIG. 8b–e) which are either wound in opposite directions and have the same instantaneous current flow direction (FIG. 8b), or interconnected to the supply in such a way that the current flow direction is reversed in some coil blocks (FIG. 8c–e). The coil block may also be reversed in terms of winding direction. In FIG. 8 the current direction at any instant is illustrated by arrow i.

Another arrangement is represented in FIG. 9, showing an induction heater subdivided into a number of coil sections or in distinct coil modules, which are connected in parallel to the supply and whereby the voltage build-up along the wires is reduced either by reversing the current direction, or the coil winding direction or both.

FIG. 9a and 9b show a coil subdivided in 2 sections with centre tapping of the supply, either with the same windings (9a) or with oooosite windings (9b). The arrow i gives the instantaneous direction of the current. In the modular building block concept (FIG. 9 c-d-e) one can change the current direction from block to block (FIG. 9c) or from block assembly to assembly (FIG. 9d) and maintain the same coil block winding direction, or also change both the winding and current direction such as represented in FIG. 9e, showing an embodiment wherein current flow and winding direction are each time reversed simultaneouosly between two adjacent coil blocks.

The most preferred embodiments of the examples shown in FIG. 8 and 9, are these multi-coil arrangements whereby simultaneously coil winding direction and current flow are reversed. In this way, potential differences between the wires and the earthed installation components are effectively suppressed to negligible levels (1 to 5 V max.) and also the local potential differences over the heating length are largely reduced. Moreover, all the ampere-turns of the successive coils remain active because the reversing arrangement also rules out the negative interaction between two adjacent coils, which interaction otherwise lowers the effective heating capacity of the heating line.

In FIG. 10, a preferred embodiment of a multi-coil building block (connected in parallel) is shown, which is additionally improved in that current supply is effected by means of a novel design of bus bar connection, comprising two parallel conductor bars of suitable form (e.g. U or L-profile) at close interdistance (max. 2 mm) and separated by a thin insulation layer, for example in the form of a 3-layer composite bar. This current supply arrangement is surprisingly beneficial in that it largely prevents the undesirable decrease in available work voltage (terminal voltage of generator versus effective voltage over the heating coil connections), not only by reducing current supply distance and related ohmic voltage drop (through parallel tapping to the supply), but in particular by suppressing or compensating the inductive field (and related voltage drop) effects along the current supply bars and/or between the supply and the coils.

The preferred embodiment shown in FIG. 10 is an induction heating line of modular building block concept, comprising a sequence of multi-wire coils (1'), connected in parallel to the supply (with current reversal between the coils) which features the improved bus bar design comprising two parallel U-profiled conductors 11, with insulating interlayer 12. An aditional advantage of the bus bar construction is that it enables quick and simple attachment/replacement of standard coil blocks.

In FIG. 11 two additional induction heating arrangements are illustrated, aimed at carrying out specific heat treatments. FIG. 11a shows a heating line for heating and soaking, comprising a first set of coils with impedance Z1 and a second set of coils with different impedance Z2, with all the coils being preferably connected in parallel to the same generator. Impedance Z2 is adapted to hold the temperature level attained after rapid linear heating with coils Z1. Other temperature profiles are of course feasible. In FIG. 11b, a preferred embodiment is shown to simultaneously heat a plurality of ferrous wire above the Curie point. The induction line is constituted of respectively a medium-frequency heating path (coils C1 connected to generator G1) and of a high-frequency heating path (C2–G2). As shown schematically in the accompanying heating diagrams, effective high-temperature inductive heating is possible (provided the required high level of generator frequency is applied and available at sufficient power) and a major part of total heating heating (up to approximately 760° C.) still occurs at optimum electrical efficiency.

It is further obvious that the multiwire induction heating apparatus being equipped with individual ceramic tubular channels, enables the use of any protective atmosphere. Gas consumption can be kept low because of the small tube diameter and gas volumes involved.

The following examples will further illustrate the practical advantages and versatility of the preferred multiwire heating apparatus and methods.

EXAMPLE 1

A multiwire induction coil having a total length of 4.6 m is used for the simultaneous heating of 36 steel wires of 1.20 mm diameter. The inductor (similar type as shown in FIG. 5) is coiled from copper strip 100×2 mm (water cooled by a copper pipe of 10 mm diameter brazed on the strip windings' outer surface), enclosing an inner inductor channel with a flat rectangular cross-section of 22 mm (height)×560 mm (width). It contains 36 ceramic tubes (in planar parallel pattern) for guiding each wire individually. The coil is divided into two coil sections, each with 17 windings, respectively right-hand and left-hand windings. A 200 kW–10 kHz generator is connected to the coil. All the wires can be uniformly heated to a temperature of up to 700° C. and at speeds up to and exceeding 50 meters per minute. In a practical example the multiwire inductor heater was used in line with a patenting and electrogalvanizing process installation to carry out a thermodiffusion step on copper and zinc-coated steel wire at a uniform line speed of approximately 40 m/minute.

The heating conditions were as follows:
induced field strength: 14–15. $10^3$ A/m
relative magnetic permeability: $\mu r = 95$–100
net dissipated heat in the wires: 70 kW
generator efficiency: 90.2%
coil efficiency: 65–72%
total heating efficiency: 60–64%
average wire temperature: 596° C.
standard deviation: 14° C.
  (standard deviation: scatter between the wires related to their relative position in heating coil and as result of slight variations in wire surface humidity after electroplating, rinsing and drying.)
max. potential difference in longitudinal wire direction 32 V (coil entry to exit)
voltage drop from wire to earthed guides reel: 26–29 V.

EXAMPLE 2

A multiwire induction heating apparatus was designed to treat simultaneously 40 ferrous wires up to a temperature of 700° C. The apparatus comprises two heating coils of 2.4 m length and 0.62 m width. Each coil has 37 copper solid strip windings of 55×2 mm (provided with water cooled copper tube) which form an inductor channel of about 20 mm height wherein 40 ceramic tubes (14 mm outer diameter, 10 mm inner diameter) are inserted. The distinct coils are connected each to a 80 kW–25 kHz generator. The 37 windings are subdivided into 18 right and 18 left-wound turns. The induction heating installation was used to treat 40 wires of 0.7 to 1.4 mm diameter at a speed of 35 to 65 m/min. In carrying out a thermodiffusion treatment on previously plated and patented wires, the working conditions were as follows:
wire 0.70% C. of 1.04 mm diameter; throughput speed 48 m/min.
applied magnetic field strength: 8500–9000 A/m
relative magnetic permeability $\mu r$ of wire material: 140–160
working frequency: 20,600 herz
Heating Results:
heating power dissipated in wire: 66 kW (generator 1+2)
heating coil efficiency: 70–76%
total heating efficiency: 58–67%
average wire temperature: 585° C.
  mean spread (40 wires): s=12.3° C.
max. potential difference on wires between entry exit of heating cols: 17 V
max. voltage drop from wires to earthed reeling means: 15.2 V

EXAMPLE 3

In this example the usefulness of the multiwire induction heating system is demonstrated for tempering of oil quenched (martensitic) steel wire, and more in particular flat wire with 5×1 mm section. For this purpose an inductor building block has been designed of 2 m length, constituted of 4 coils of 0.50 m in series, each comprising 50 windings of tubular copper.

The coils were connected to a 40 kW-generator working at 25 kHz. In the heating coil tunnel 10 ceramic conduits of rectangular cross-section 16 a 10 mm (wall thickness 2 mm) were arranged to pass each of the 10 flat wires through its respective ceramic channel. The shaped wires were tempered at a temperature of 480° C. at a speed of 10 to 25 m/min. Mean spread of wire temperature was smaller than 10° C.

The system, which replaces a conventional lead tempering bath, is particularly advantageous in that it is compact and clean in terms of working environment in that the lead contamination, which sometimes affects wire surface quality, is absent and in that total energy consumption is markedly lower—i.e. negligible heat loss to surroundings; compact system with zero heat content, no stand-by heating, etc.

To demonstrate the versatility of the multiwire coil provided with flat tubular ceramic guides, it was tested for simultaneously heating a plurality of multiwire tapes, each tape comprising 10 parallel wires of 0.5 mm held together by an adhesive compound. The test revealed that it was perfectly possible to dry and cure the composte wire tapes at a constant temperature (200° to 300° C.) and at elevated velocities of up to 300 m/min. Energy efficiency amounted to 55–70% (coil efficiency up to 80%) according to generator type and load factor.

EXAMPLE 4

In this example the versatility of multiwire heating coils is illustrated with regard to various heating applications. Different coil winding materials have been used to fabricate the desired multi-wire heating coils.

In a first series of tests a 10 wire induction heater was provided with one or more heating coils of a total heating length ranging from 1 to 2 m. Steel wires with a diameter from 0.5 to 1 mm were heated to different temperature levels below 750° C. Wire throughput speed was varied from 20 to 100 m/min.

Two generator types were used: a 40 kW–25 kHz device and a 80 kW–10 kHz device.

Inner coil height was 22 mm, filled with one row of ceramic tubes of 15 mm diameter.

Among the tested coil windings were: solid copper strip (20×2 mm), layered cooper foil (10 layers of 20×0.2 mm), copper cable (7×4×0.30 mm), copper strip (55×2 mm) with exterior cooling tube and flattened copper tube (10×6 mm). The volumetric power density Q (total heat dissipated in the wires divided by number of wires, coil length and wire cross-section) was varied from 0.3 to 3 kW/m/mm$^2$ and the actual heating efficiencies were compared, calculated from power supplied by the mains and from the amount of coil losses and generator losses (measured by determining heat content of cooling water).

The general conclusions of the tests are as follows:
the multiwire induction heating coils made it possible to carry out rapid heating of medium to small wire diameters with reasonably good total energy efficiency. According to wire diameter, velocity (applied energy density) and generator type the total efficiencies range from 50 to 75%. coil efficiencies are higher than 65% and mostly range from 70 up to 85% (lowest value for highest energy density of 3 kW/m/mm$^2$).

for highest wire speeds improved coil designs (optimum length and number of windings per m to allow optimum energy density conditions) allow one to increase coil efficiency by 5–15%.

generator type in particular generator efficiency curve vs. load factor, is important to attain improved "total" energy efficiencies.

wire velocities in the 150–250 m/min. range are perfectly sustainable.

max. rate of wire speed in multiwire induction heating can in principle be raised to above 500 m/min. (still with satisfactory heating efficiency) when enlarging the total heating length of a modular inductor building block by ading additional coil modules with all the coils connected in parallel to a current source (one or more generators) of sufficient power.

EXAMPLE 5

In this example, referring also to FIGS. 8 and 9, a large number of coil arrangements has been investigated for the purpose of controlling the axially induced voltage build-up in the moving wires. A heating length of 4.5 to 5 m was chosen and provided with either continuous coils, subdivided coils or modular coil blocks (either serially or connected in parallel to the supply), whereby the winding direction and/or the phase of the current were changed. The unexpected results of these investigations was the fact that current flow direction in the coil section or coil block is comparatively of greater effect and importance in controlling and compensating the induced voltage in the longitudinal wire direction than the change in magnetic flux direction by using opposite windings. In theory both measures should have similar effects. We observed, however, in imposing a current direction reversal between 2 coil sections or 2 adjacent coil blocks, that total heating capacity is lowered to a significant extent. The most preferred arrangement, which we found to be surprisingly effective in practice when using a squence of replacable coil blocks (connected in parallel to the supply), is the simultaneous reversal of both the current flow direction and the winding direction. Some typical results are given below:

heating profiles such as for example a programmed heating schedule.

Whilst the embodiments have been particularly concerned with thin wires, the apparatus and processes could be used for much thicker wires, e.g. 3 to 6 mm diameter or larger, as well as non-ferrous e.g. copper wires, stainless steel wires, or shaped wires of non-circular cross section. Additionally, high temperature heating is possible—e.g. above the Curie point when ferrous materials become non-magnetic. The inductor configuration and frequency should be adapted for each specific purpose.

Considering now various aspects and advantages of the preferred embodiments of the invention, without limiting the broader aspects thereof, the apparatus permits heating of a number of elements in which each element is to be subjected to the same heating profile extending along the length thereof and is guided along a distinct insulated path through the apparatus, the individual paths being arranged in such a way as to form a regular array of straight and parallel channels contained in the interior space of a common inductor and enveloped by the windings thereof.

In addition to being energy efficient and being capable of uniform, effective and economic heating up to high wire speeds and down to small wire sizes, the apparatus permits identical heating of each individual wire to an adaptable heat profile, eliminates the need to stop the whole line in case of an incidental wire break (even at elevated wire velocities) and prevents the occurrence of wire surface defects such as e.g. contacting and/or sparking marks.

The preferred induction heating apparatus comprises suitable means for feeding and energizing the inductor with a regulable current of desired frequency and further comprises suitable means for conveying the plurality of elements at the same adjustable rate of speed longitudinally along their respective parallel work paths leading to and through the heating coil(s) of the inductor, the apparatus being provided more specifically with a flat shaped inductor constituted of one or

|  | Type of coil (total length of 4.5–5 m) | Voltage | |
|---|---|---|---|
|  |  | A | B |
| serially connected | (1) continuous coil | up to 80 V | 50–70 V |
|  | (2) subdivided coil in left and right hand wound section | 33 V | 24–29 V |
|  | (3) 2 subdivided coils as in (2) | 20 V | 14–16 V |
|  | (4) 4 coils: change in windings | 30–48 V | 5–15 V |
|  | (5) idem as (4) reversal with one current reversal | 16–20 V | 1,9–9 V |
|  | (6) idem as (4); 3 current reversals | 12–16 V | 1,8–2,5 V |
| connected in parallel | (7) 10 coil blocks with same winding direction, current reversal between coils 5 and 6 | 20–30 V | 2–5 V |
|  | (8) current and winding direction reversal in all coils | 2–9 V | 0–1 V |

A = max. potential difference over heating length.
B = actual measured voltage between heated wires leaving the inductor and the earthed spooling device.

It is evident that many modifications are possible, such as for example in the choice of the most appropriate coil geometries, inductor tunnel design and work path configuration and the like for a given application. In addition the induction systems as described hereinbefore may be provided with suitable temperature sensors and appropriate current regulating devices aimed at subjecting the workpieces to automatically controlled more induction heating coils disposed adjacently in the longitudinal wire direction, which coils form an induction heating tunnel of adaptable length with flat rectangular cross-section containing all the work paths therein. The work paths are arranged in one or more horizontal rows of closely spaced insulated channels through which the metal elements are individually guided and along the length of which the elements are brought to the same prescribed temperature.

From another aspect, the preferred apparatus comprises a flat shaped inductor device for inductively heating metal wires, more in particular a multiwire inductor for heating simultaneously a plurality of ferrous metal wires (for example to a temperature not exceeding their Curie point; approximately 750° C.), whereby the wires are guided individually through identical refractory channels disposed in the inductor channel preferably as a one-layer sheet, which channels extend over the full length of the respective heating coils of the inductor. According to a specific design possibility of the multiwire coil, the channels can be in the form of a multihole ceramic muffle, and most preferably in the form of distinct (replacable) ceramic tubes of suitable cross-section, disposed as a closely packed one-layer configuration and tightly enveloped by the coil windings.

From a still further aspect, the preferred apparatus provides an improved inductor system for simultaneously heating a plurality of identical wires with a high energy efficiency (exceeding 50%) and elevated wire capacity (heating up to 40 and even more wires simultaneously at velocities ranging from 10 to more than 100 m/min. according to wire type and process), which inductor line may be constituted of one continuously wound coil unit of desired coil length or of a number of separate coil modules (as replacable blocks) of shorter length arranged together (in a so-called building block concept) longitudinally and electrically connected in series or in parallel so as to form a multi-wire heating path of any desirable length thereby allowing progressive power input and effective heating at any desired rate and further allowing, by selecting the optimum combination of coil parameters and energizing conditions (current density and frequency), one to enhance energy efficiency and wire throughput well above prior art methods for induction heeating of wires. The coil or coil module construction may be made in the form of an integrated preassembled building block containing all necessary electrical and cooling attachments and having the insulated coil windings rigidized in an electrically non-conductive moulding mass or rigidized by other suitable mechanical means so as to maintain in service a constant height of the flat interior inductor tunnel, in which a plurality of replacable ceramic tubes is fitted for conveying the invididual wires in parallel straight paths from entry to exit, whereby the tubes may extend uninterruptedly over the entire heating length or are only continuous per coil module length and then interconnected in line from one coil block to another so as to provide a continuous wire path.

In accordance with a preferred feature there is provided a specific arrangement of coil windings and of the electrical connection of the successive heating coils to the current supply so as to minimize voltage build-up along the length of the inductively heated wires and thereby avoiding possible sparking between the wires and the guidance or take-up members.

A further preferred feature relates to the current supply connection betwen generator and working coils which connection is designed in such a way that ohmic losses, and in particular inductive voltage losses, are substantially reduced so that actual available power (ratio of coil working voltage to terminal voltage of generator) remains the highest possible. Accordingly, there is provided a bus bar connection of composite construction comprising two parallel conductor profiles at very close distance, having a thin insulation layer separating said profiles, which composite bus bar is disposed parallel to the longitudinal inductor direction. This bus bar, and particularly in combination with induction coils, may be used in contexts other than those disclosed herein.

In accordance with the preferred process, there is provided an improved method for inductively heating a plurality of ferromagnetic metal wires, such as carbon steel wires, which improvement relies upon the judicious selection of coil geometry and coil energizing conditions, in which the active magnetic field is kept below a level of 30 to 35,000 A/m and the relative magnetic permeability of the heated wires exceeds a value of 40–50, so as to minimize coil losses for a given wire diameter range without imparting heating capacity and wire throughput.

In the preferred embodiments there are provided reliable and economic methods and an improved multiwire induction apparatus for use in uniformly heating a plurality of carbon steel wires of 0.3 to 3 mm diameter at elevated travelling speeds and at high efficiencies, without the need to stop the line in case of an incidental wire break and without causing sparking defects.

A general advantage of the preferred embodiment featuring a particular inductor design, a flexible coil block concept and an improved energizing arrangement, is the possibility of carrying out contactless, rapid and economic heating of ferromagnetic steel wires at high rates, which heating step may be carried out separately or continuously in line with a preceding or subsequent wire treatment stage (depending on the type of wire process or multiwire processing installation) and which step can be adapted in velocity to be consistent with the optimum processing speed of the entire manufacturing line.

We claim:

1. In an apparatus for inductively heating simultaneously a plurality of elongate workpieces to a generally similar temperature over the length thereof, said workpieces having a substantially uniform cross-section over their respective lengths, and wherein said workpieces are individually conveyed at the same predetermined uniform rate of speed longitudinally along a plurality of similar work paths; the improvement comprising, inductor heating means having at least one elongated heating zone, said heating zone comprising multi-channel inductor coils, each coil having an entrance and an exit end and having electrical windings which completely envelop said plurality of work paths over the length of said coil, each coil also beig divided into at least two adjacent coil lengths, wherein the direction of the current flow and the direction of the coil winding are reversed simultaneously between at least two adjacent coil lengths, said multi-channel inductor coils being longitudinally disposed about said plurality of work paths to form a stack of separate, closely spaced guide channels defining a linear heating path of prescribed length; and means for activating said inductor heating means to a prescribed adjustable energization level.

2. Apparatus as claimed in claim 1, wherein said work paths are parallel and extend continuously in the same generally linear direction of the inductor coil(s) and the work path lengths contained in the respective inductor coil tunnels are electrically insulating channels.

3. Apparatus as claimed in claim 2, wherein said parallel work paths are arranged in a horizontal plane extending over the entire longitudinal heating length of the successive coils and said parallel work paths surround one layer of said insulated guide channels.

4. Apparatus as claimed in claim 1 wherein the work path configuration contained in the inductor tunnel is in the form of a monolithic construction of a suitable heat-resistant and electrically insulating material, such as a grooved ceramic plate or a multihole refractory muffle comprising the desired plurality of separate guide channels.

5. Apparatus as claimed in claim 1 wherein the guide channels comprise distinct identical ceramic tubes inserted in the inductor tunnel.

6. Apparatus as claimed in claim 1 wherein the inductor heating means comprise one or more heating coils of flat rectangular shape tightly enclosing a plurality of closely packed ceramic tubes for individually guiding the wires through the inductor tunnel, wherein said tunnel has a constant height and cross-section in the longitudinal inductor direction.

7. Apparatus as claimed in claim 6 wherein an additional heat-insulating layer of suitable thickness is provided between the coil windings and the planar array of ceramic tubes.

8. Apparatus as claimed in claim 6 or 7 wherein the electrically insulated coil windings are made of high conductivity copper selected among a group of conductor materials comprising wire, cable, strip, multilayer thin strip, copper tube and the like, said conductors having a suitable cross-section for carrying the required current densities and for being formable to flat coils of minimum effective inductor height.

9. Apparatus as claimed in claim 8 wherein the windings are made of solid copper and directly cooled in a water jacket enclosing the outer periphery of the heating coil, the inner periphery of which is sealed from the inductor tunnel by a suitable sheet.

10. Apparatus as claimed in claim 8 wherein the coil windings are made of a copper strip conductor having a water cooled copper tube brazed to its exterior surface.

11. Apparatus as claimed in claim 8 characterized in that the coil windings are made of a water cooled tubular copper conductor of appropriate geometry, such as round tubes, flattened round tubes, oval shaped tubes and the like, which are formable into flat, windings of the desired low height.

12. Apparatus as claimed in claim 1 wherein the coil windings and related inductor height are dimensionally stabilized either by suitable mechanical fixing means or by providing the coil with a rigid moulded on jacket of a moulded plastic, a fibrous cementitious material or the like.

13. Apparatus as claimed in claim 1 wherein the total heating length comprises a number of individual coil blocks connected either in series or in parallel to the supply, or arranged in two or more groups of one or more coil blocks with separate current supply per group, whereby the coil blocks of each group may be connected serially or in parallel to their respective current supply.

14. Apparatus as claimed in claim 1 and further comprising means for preventing excessive voltage build up in the longitudinal direction of the inductively heated workpieces.

15. Apparatus as claimed in claim 1 wherein said inductor heating means is formed as separate coil blocks, some of which comprise opposite winding angles and are divided into coil sections which are connected to each other and to the supply in such a way as to reverse the direction of the current flow in some of the coil sections, so as to reduce or suppress the occurrence of voltage build-up along the wires.

16. Apparatus as claimed in claim 15, characterized in that the coil winding direction and the current flow direction are reversed simultaneously between two adjacent coil sections or blocks, so as to reduce longitudinal potential differences to substantially harmless levels and at at the same time to maintain the magnetic field in an identical direction over the total heating length.

17. Apparatus as claimed in claim 15, there is provided a sequence of identical heating coil blocks of short length forming a total heating zone of the required length and the coil blocks are connected in parallel to their respective power supplies, whereby the current flow direction and the coil winding direction are each time changed simultaneously betwen two adjacent coil blocks, and further characterized in that a common current supply is provided by means of a bus bar connection of low inductive voltage drop, comprising two parallel conductor bars or profiles separated by a thin insulation layer of no more than 2 mm thickness.

18. An induction heating apparatus for heating a plurality of elongate elements, said induction heating apparatus comprising a coil having windings and a generally flat cross section; said coil being divided into at least two adjacent coil lengths, wherein the direction of the curent flow and the direction of the coil winding are reversed simultaneously between at least two adjacent coil lengths.

19. An induction heating apparatus according to claim 18, wherein said induction heating apparatus comprises a plurality of insulated parallel guides for receiving said elongate elements.

20. An induction heating apparatus according to claim 19, wherein said plurality of insulated parallel guides comprises more than twenty insulated parallel guides.

21. An induction heating apparatus according to claim 18, wherein said coil is divided into at least two adjacent coil lengths.

22. An induction coil according to claim 21, wherein the direction of the current flow is reversed between at least two adjacent coil lengths.

23. An induction coil according to claim 21, wherein the direction of coil winding is reversed between at least two adjacent coil lengths.

24. An induction heating apparatus according to claim 18 wherein the direction of the current flow and the direction of the coil winding are reversed simultaneously between adjacent coil lengths.

25. An induction heating apparatus according to claim 24 wherein the length of the coil is greater than 1 m.

26. An induction heating apparatus according to claim 18 wherein the length of the coil is greater than 1 m.

27. Apparatus as claimed in claim 21, characterized in that both the direction of coil winding and the phase of the energising current are reversed between adjacent lengths.

28. Apparatus as claimed in claim 21 characterized in that the coil lengths are connected to the energising current by a bus bar comprising two parallel conductors separated a small distance by an insulating layer and extending parallel to the axis of the coil lengths.

29. Apparatus as claimed in claim 18 wherein means are provided for receiving a single row of elements as a planar array closely enveloped by the windings of the coil.

30. Apparatus as claimed in claim 29 wherein the means for receiving the elements comprises a plurality of parallel guides.

31. Apparatus as claimed in claim 30 wherein the guides are in the form of tubes.

32. Apparatus as claimed in claim 30, characterized in that the guides are of an insulating material.

33. Apparatus as claimed in claim 18 wherein the windings of the coil are substantially flat.

34. Apparatus as claimed in claim 18 wherein means are provided for energising the coils at a frequency in the range of 5 to 30 kHz so as to provide a field strength in the range of 5 to 20 kAm$^{-1}$.

35. An induction heating apparatus which is divided into distinct coil sections each having a coil winding direction and a current flow direction, the coil winding direction and the current flow direction being reversed simultaneously between two adjacent coil sections, so as to reduce longitudinal potential differences to substantially harmless levels and at the same time to maintain the magnetic field in an identical direction over the total heating length.

36. A method of induction heating a plurality of elongate elements comprising:
providing an induction coil with a plurality of windings having a generally flat cross section;
dividing said induction coil into at least two adjacent coil lengths;
simultaneously reversing current flow and direction of the coil winding between at least two adjacent coil lengths; and
moving said elongate elements through said induction coil.

37. A method as claimed in claim 36 wherein the magnetic field strength is so adjusted that the relative magnetic permeability of the element is at least 40.

38. A method as claimed in claim 37, wherein the relative magnetic permeability is at least 80.

39. A method as claimed in claim 38, wherein the relative magnetic permeability is in the range of 100 to 200.

40. A method as claimed in claim 37, 38 or 39 characterized in that each element is a wire with a diameter of up to 5 mm.

41. A method as claimed in claim 40 wherein the wire diameter is in the range of 0.5 to 3 mm.

42. A method as claimed in claim 36 wherein the magnetic field strength is in the range of 3,000 to 35,000 Am$^{-1}$.

43. A method as claimed in claim 42 wherein the magnetic field strength is in the range of 5,000 to 20,000 Am$^{-1}$.

44. A method as claimed in claim 36 wherein the frequency of the energising current is in the range of 5 to 30 kHz.

45. A method as claimed in claim 36 wherein said plurality of the elongate steel elements are moved through said induction coil in parallel paths in a continuous process.

46. A method as claimed in claim 45, wherein said elements are arranged in a row.

47. A method as claimed in claim 46, wherein a single row of elements is provided as a planar array closely enveloped by the coil windings.

48. A method as claimed in claim 46 or 47 characterized in that the elements are passed through insulating guides.

49. A method as claimed in claim 36 wherein each element is passed through at least two adjacent coil lengths with the direction of coil winding and/or the phase of the energising current being reversed between the adjacent coil lengths.

50. A method as claimed in claim 49 characterised in that both the direction of coil winding and the phase of the energising current are reversed between the adjacent coil lengths.

51. A method as claimed in claim 36 and wherein said step of providing an induction coil comprises:
providing a plurality of parallel longitudinal work paths in a common inductor tunnel, closely spaced and electrically insulated from each other, and extending in the same linear direction;
providing one or more multi-turn inductors, disposed side by side and having their coil windings coaxially arranged about said plurality of work paths; and said moving step comprises:
feeding the individual wires longitudinally along each work path at a predetermined constant rate of speed towards and through said inductors; and
energizing said inductors to a preselected energization level as said wires pass through said inductors, wherein the current frequency is in the range of a few thousand to more than 50,000 Hertz, preferably from 5,000 to 30,000 Hertz for wires of 0.5 to 3 mm diameter.

52. A method as claimed in claim 51, wherein said wires travel along parallel work paths in a horizontal plane, each of said work paths comprising a close one-layer planar stacking of ceramic tubes forming a flat essentially rectangular multiwire inductor tunnel surrounded by the coil windings of the respective heating coils.

53. A method as claimed in claim 51 or 52 and further comprising a plurality of heating coils connected serially or in parallel) to the current supply of one frequency generator of sufficient power, or alternatively grouped and connected to a separate generator for each group.

54. A method as claimed in claim 53 wherein the respective heating coils are adapted in impedance and connected to the current supply or supplies in such a way as to produce a heating profile over the length thereof comprising a first stage of substantially linear increase to a preset temperature level and a second stage of controlled holding at said preset temperature.

55. A method as claimed in claim 51 wherein the combination of inductor design and energizing conditions is adjusted so as to maintain the relative magnetic permeability of said wires at a level of not less than 50, preferably above 80 and most preferably in a range of 80–100 to 150–200.

56. A method as claimed in claim 55, wherein the applied energizing magnetic field is selected in a range from 3,000 to 35,000 ampere turns per meter, preferably from 5,000 to 20,000 A/m.

57. A method as claimed in claim 51 wherein the wires are first heated by medium-frequency current of 5,000 to 50,000 Herz to a temperature just below the Curie point, and in that the wires are subsequently raised in temperature by using in-line a second multi-wire inductor, connected to a high-frequency generator of at least 50,000 Herz.

* * * * *